United States Patent Office 2,735,870
Patented Feb. 21, 1956

2,735,870

PEROXIDES OF SATURATED CYCLIC TERPENES AND METHOD OF PRODUCING SAME

Gordon S. Fisher and Leo A. Goldblatt, New Orleans, La., assignors to the United States of America as represented by the Secretary of Agriculture No Drawing. Application December 8, 1950,
Serial No. 199,910

10 Claims. (Cl. 260—610)

(Granted under Title 35, U. S. Code (1952), sec. 266)

The invention herein described may be manufactured and used by or for the Government of the United States of America for governmental purposes throughout the world without the payment to us of any royalty thereon.

This invention relates to improved methods for the production of saturated cyclic terpene peroxides and saturated cyclic terpene oxidates containing major proportions of the peroxides. It also relates to methods for the production of saturated cyclic terpene peroxides by a non-catalytic liquid phase oxidation of saturated cyclic terpenes with an oxygen-containing gas.

The invention provides novel saturated cyclic terpene peroxides and compositions containing them. In addition to the saturated cyclic terpene tertiary-hydroperoxides, and the pinanyl tertiary-hydroperoxides, $C_{10}H_{17}OOH$, in particular, the oxidates of saturated cyclic terpenes, i. e., solutions consisting of saturated cyclic terpenes and the predominantly hydroperoxy oxidation products of such terpenes produced in situ by the action of gaseous oxygen, and the concentrated solutions of saturated cyclic terpene tertiary-hydroperoxides in saturated cyclic terpenes constitute particularly valuable classes of such compositions.

As used herein, the term peroxides is generic and includes hydroperoxides. The term saturated cyclic terpenes refers to compounds which, structurally, are obtainable from cyclic terpenes by the saturation of their double bonds and to mixtures of such compounds with inert substances, without regard to the particular method or starting material used to produce the mixture. Saturated cyclic terpene radical names produced by replacing e with yl, e. g. pinanyl from pinane, refer to monovalent radicals formed by the removal of any hydrogen atom from the hydrocarbon.

The peroxides produced by the process of this invention are principally hydroperoxides. When they are produced from saturated monocyclic terpenes, they have the empirical formula $C_{10}H_{19}OOH$, and when they are produced from saturated bicyclic terpenes they have the formula $C_{10}H_{17}OOH$. The following schematic formulas are illustrative of the structures of particularly valuable hydroperoxides provided by the invention:

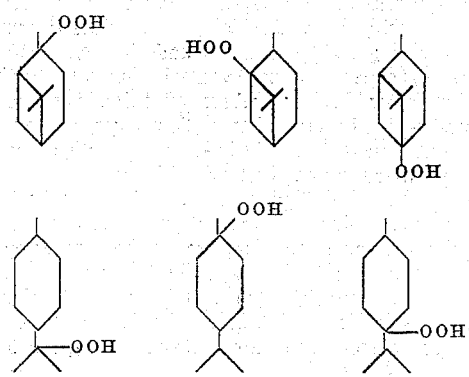

Methods for producing saturated derivatives of terpenes are well-known. For example, pinane may be produced in excellent yields by the hydrogenation of gum turpentine, alpha-pinene, or betapinene, with platinum or palladium catalysts at low temperatures and pressures; or with nickel, at higher temperatures and pressures. Paramenthane may be prepared by the hydrogenation of paracymene, dipentene, limonene, and the menthenes. Camphane may be prepared by known methods such as the hydrogenation of bornylene, and isocamphane may be obtained by the hydrogenation of camphene.

The oxidation of saturated cyclic terpenes has heretofore been a difficult and tedious process. Some of the terpenes of this class have produced no useful results, generally resulting in decomposition products produced at least by the opening of a ring. See, for example, the results of oxidizing pinane in Simonsen "The Terpenes," second edition, Cambridge Press, vol. II, page 104 et seq.

While various hydrocarbons react with gaseous oxygen to produce peroxides, in general a peroxide content of more than about 5 to 10 percent cannot be obtained and the reaction is impractically slow when conducted in the absence of a catalyst.

It has been found that when saturated cyclic terpenes are oxidized in the usual manner, i. e., at a constant elevated temperature, the peroxide content of the oxidate increases to a maximum, generally less than 5 to 10 percent and when the oxidation is continued after the maximum is reached, the peroxide content actually decreases. Such oxidates have no practical utility in themselves, but, have to be concentrated by physical or chemical methods in order to obtain useful concentrations of peroxides.

However, a method has now been discovered whereby the non-catalytic liquid phase oxidation of saturated cyclic terpenes can be controlled so that peroxide contents as high as 60 percent can be obtained in as little as 7 hours.

According to the present invention, the saturated cyclic terpenes are oxidized in the liquid phase with an oxygen-containing gas, and avoid the necessary employment of an expensive or difficultly removable catalyst. Oxidates containing 20 percent or more of saturated cyclic terpene hydroperoxides are produced in a single oxidizing step. The individual peroxides so produced can be separated from or concentrated in the oxidates, but the oxidates themselves are useful for many purposes without further treatment.

The invention includes two main methods for controlling oxidation and for directing the course of oxidation in the desired direction. The invention is based in part upon the discovery that oxidates, containing from 20 percent to as much as 50 percent or more of saturated cyclic terpene peroxides, can be obtained by a process involving the liquid phase oxidation of a saturated cyclic terpene hydrocarbon with an oxygen-containing gas when the oxidation is initiated at a temperature of 80°–150° C., and the temperature is reduced during the course of the oxidation in such a manner as to maintain peroxide accumulation. This generally leads to a final temperature of from about 50° to 110° C. The rate of temperature reduction during the course of the oxidation is such that the rate of peroxide formation exceeds the rate of peroxide decomposition. We have found that this condition of net gain in peroxide formation can be induced over a considerable temperature range.

The invention is likewise based in part upon the discovery that during a liquid-phase oxidation, the maximum attainable peroxide content of the oxidate at a given temperature is greatly increased by removing the more volatile by-products of the oxidation as rapidly as they are formed. This removal may be accomplished by known methods such as by-passing a current of gas through the oxidation reactor at a rate sufficient to sweep out the volatile by-products without substantial entrainment of the saturated cyclic terpene.

These discoveries can be utilized to produce the novel saturated cyclic terpene oxidates herein described, and in addition, they can be utilized as an economical means of converting the terpenes to oxygenated compounds from which numerous valuable derivatives containing an intact terpene nucleus can be obtained.

In carrying out the oxidation in accordance with the process of the invention the best results are obtained when the saturated cyclic terpenes starting materials are substantially free of unsaturated material. A simple test of suitability of the starting material consists in shaking a small amount of it for about two minutes with an equal volume of 85 percent aqueous sulfuric acid solution. If, after settling, the sulfuric acid is colorless or very pale yellow, the material is satisfactory. When darker colors are formed in the test, it is advisable to purify the starting material by washing with sulfuric acid, by distilling, or by treatment with an adsorbent such as silica gel to remove unsaturated materials.

Although in general any saturated cyclic terpene may be used as a starting material in our process, pinane or p-menthane are particularly valuable. They are readily available and yield stable hydroperoxides which are easy to separate from the unoxidized hydrocarbons.

The oxidizing gas employed in this invention can be atmospheric air or mixtures of gases containing gaseous oxygen in sufficient amount to effect the oxidation. The preferred oxidizing gas is oxygen-enriched air or pure oxygen. In the latter case, it is economically advantageous to pass the exit gas coming from the oxidation through a suitable scrubbing system to remove the condensible and entrained volatile by-products, and to recycle the purified gas to the oxidation process.

The peroxide accumulation during the oxidation can be followed by periodic sampling of the oxidate and analysis of the sample for peroxide by any of the conventional methods. We prefer to use the following iodimetric method. An aliquot of the oxidate containing not more than 3 milliequivalents of peroxide is weighed and dissolved in 30 ml. of chloroform-acetic acid (2:3 by volume) to which 3 ml. of saturated aqueous potassium iodide solution is added and the mixture is allowed to stand in the dark for 5 min. 30 ml. of water is then added and the mixture is titrated to an end point with 0.1N thiosulfate using starch as an indicator. The results may be expressed as peroxide number which is defined as the number of milliequivalents of active oxygen per kilogram of oxidate or expressed as parts of active oxygen per million parts of oxidate, or as percent peroxide. Percent peroxide as reported herein refers to percent by weight calculated as saturated terpene monohydroperoxide.

The process of this invention can be conducted in a batch-wise or continuous manner, and recycling provides the usual advantages. For example, the process of the invention can be conducted in a batch process in which the oxidation is initiated at a higher temperature such as 120° C. and the peroxide number of the oxidate is determined at suitable intervals, until the peroxide number becomes constant or drops slightly. The temperature can then be lowered about 5° to 10° C. and the oxidation continued as before until the peroxide number again reaches a maximum. In general these steps would be repeated until an oxidate having a peroxide content of 25 percent to 50 percent or more is obtained. The maximum peroxide content which can be obtained will depend to some extent on the particular saturated cyclic terpene used.

While the oxidation can be initiated at any temperature between about 80° C. and 150° C., it is preferred to start at temperatures between about 100° and 120° C. At the higher temperatures excessive amounts of by-products may be produced and at the lower temperatures the induction periods, in some cases, are unduly long. Similarly, final temperatures of oxidation can be selected as low as 50° C. or below, but it is usually preferred to stop the oxidation at temperatures between about 80° C. and 110° C. because in general the rate of peroxide accumulation at the lower temperatures becomes uneconomically low.

When for special purposes maximum purity of product is imperative and the reaction time is unimportant, both low initiating temperatures and low final temperatures may be used to advantage.

Oxidation to the maximum attainable peroxide content at each temperature may lead to the production of oxygenated by-products which are harmless for some uses of the oxidates, but may be undesirable for other uses. The rate of peroxide accumulation at a particular temperature usually decreases before the maximum peroxide content is obtained, and the efficiency of peroxide production is thereby reduced. Hence, it is usually preferred to lower the temperature before the maximum peroxide content is attained: in general, when the rate of peroxide accumulation begins to decline appreciably. While the temperature may be lowered at any time or when any peroxide content is attained, it is usually preferred to continue the oxidation at the initiating temperature until the induction period is over and the rate of peroxide accumulation becomes constant or begins to decrease before making the first decrease in temperature. Subsequent decreases can conveniently be made as soon as the rate of peroxide accumulation at a particular temperature decreases. In the oxidation of pinane a satisfactory modification of the basic process consists of initiating the oxidation at 115° to 125° C. and decreasing the temperature about 5° C. for each 8 percent to 12 percent of peroxide formed or by a continuous decrease in temperature at such a rate that the temperature is lowered about 5° for each 10 percent of peroxide accumulated.

The oxidates prepared by the process of the present invention may be concentrated by any of the conventional methods. For example, a low pressure carrier gas distillation to strip off the unoxidized hydrocarbon leaving the peroxide as a residue, a low pressure vacuum distillation of the peroxide, or a precipitation of the hydroperoxide as the sodium salt, are satisfactory methods for the isolation of the saturated cyclic terpene hydroperoxides.

If desired, a small amount of the saturated cyclic terpene hydroperoxide may be added to the feed stock to be oxidized. This may be added either in the form of the substantially pure hydroperoxide or in the form of an oxidate. In general, the addition of 1 percent to 10 percent by weight of pure hydroperoxide will reduce the induction period, and thus, the overall time required to produce an oxidate of the desired peroxide content. This modification is most useful when it is desired to initiate the reaction at 100° C. or less.

As previously stated, the invention also includes removing the more volatile by-products of the oxidation as rapidly as they are formed. This phase of the invention improves the oxidation whether carried out independently or in combination with the step-wise temperature reduction process described in the foregoing paragraphs. When so combined, the yield of peroxides in the oxidate mixture is greatly enhanced, and the combined process is rapid and economical even when applied to the more difficultly oxidized members of suitable starting compounds. In the operation of this phase of the invention by removing the volatile by-products with a carrier gas, the volatiles may be removed with the oxygen-containing gas used as the oxidizing agent. Alternatively, they may be removed with an inert gas, such as nitrogen, carbon dioxide, or the like. The use of the oxygen-containing gas as a carrier gas is generally preferred. The carrier gas or gases may be introduced below the surface of the saturated cyclic terpene in a suitable reactor, or the gas may be passed merely through the head space of the reactor. When the carrier gas is the oxygen-containing gas, it may be passed merely through the head space, but it is preferred to agitate the liquid phase vigorously in that case in order to maintain a rapid rate of oxygen absorption. When a second, preferably inert carrier gas, is used for the flushing operation, it is advantageous to disperse the oxidizing gas below the surface of the liquid phase and pass the inert gas through the head space. In modifications of the process in which essentially gaseous oxygen is employed as the oxidizing agent, it is advantageous to recycle the exit gas after removing condensible and entrained volatile by-products.

The beneficial effect of removing volatile by-products from the scene of reaction substantially as fast as they are formed may be realized at oxidizing temperatures between about 50° and 150° C. Excellent results have been obtained at temperatures between about 90° C. and 120° C.

The latter phase of the invention will be discussed in the following paragraphs, independently of the phase of the invention involving gradual reduction of the reaction temperatures. It is to be understood, however, that the two phases may be combined with particularly advantageous results, as previously stated.

The particular temperature chosen will depend upon the saturated cyclic terpene being oxidized and upon the use to be made of the oxidate. When high peroxide content in the final oxidate is the sole basis for choice of operating conditions, relatively low oxidizing temperatures will be chosen. When maximum rates of production of an oxidate of lower peroxide content are desired, higher oxidation temperatures are preferred. The rate of peroxide accumulation frequently decreases before the maximum peroxide content is reached. Therefore, it is frequently desirable to stop the oxidation when the rate of peroxide accumulation becomes uneconomical.

The oxidates produced by the present process are excellent starting materials for the preparation of substantially pure saturated cyclic terpene hydroperoxides. Simple removal of the unoxidized hydrocarbon by suitable distillation, such as a low pressure steam distillation, usually leaves substantially pure hydroperoxides as the residue. Since some non-volatile oxygenated by-products may be produced, particularly in the later stages of oxidation, oxidates containing only about 30 to 60 per cent of hydroperoxides are generally preferred for the preparation of the substantially pure hydroperoxides by distillation methods. Other methods of concentration, such as precipitation of the hydroperoxide as the sodium salt or extraction of the hydroperoxide from the oxidate with aqueous or alcoholic base and subsequent regeneration of the hydroperoxide from the salt, may also be used.

While the foregoing discussion was concerned with operation of the process as a batch process, it can obviously be operated equally well as a continuous process, for example, by continuously introducing the saturated cyclic terpene to the reactor and continuously removing the oxidate once the desired peroxide content has been attained, or by maintaining a suitable temperature gradient in a reactor through which the terpenes pass.

The process of the invention, which may be practiced according to either of the two procedures described above, is particularly valuable in the production of oxidates containing more than about 45 percent by weight of saturated cyclic terpene hydroperoxides. In each procedure, singly or combined, the novel conditions are so controlled that the hydroperoxides are formed rapidly and decomposition of the peroxides is minimized. The oxidates find novel uses as polymerization catalysts, either as the separated hydroperoxides or as the more or less crude oxidates rich in hydroperoxides.

The oxidates produced by the present process find use, without further concentration, as catalysts for polymerization reactions; for example, in the polymerization of butadiene-styrene in 5° C. GRS formulations. In this connection 0.18 part of a pinane oxidate, prepared by the process and containing 55 percent by weight of pinane hydroperoxide, per 100 parts of monomers in a sugar free iron redox formulation, at 5° C. gave 60 percent conversion of monomers to polymer in 8 hours.

In the specific examples which follow, particular features of the invention are illustrated in detail by application to individual compounds and conditions. However, since many modifications in the procedures illustrated and compounds used are obviously within its scope, the invention is not to be construed as being limited to the particular compounds or steps recited in the examples.

EXAMPLE I.

*The effect of temperature lowering*

A 13.8 g. sample (0.10 moles) of pinane, $n_D^{20}=1.4624$, $d_4^{20}=0.8560$, $[\alpha]_D=+15.3°$ was oxidized with oxygen by stirring the pinane vigorously in an atmosphere of oxygen under a slight positive pressure. The reaction was initiated at about 120° C., and the temperature was lowered at suitable intervals to give an average decrease of about 5° C. for each 10 to 15 percent increase in peroxide content. The peroxide content temperature of the oxidate at various intervals during the oxidation were:

| Hours | Temperature, °C. | Percent by weight of peroxide |
|---|---|---|
| 0 | 120 | 0 |
| 1 | 115 | 10 |
| 2.5 | 110 | 22 |
| 4.5 | 105 | 41 |
| 7 | 100 | 50 |

EXAMPLE II

*The specificity of oxidation with temperature lowering*

Eighty-three grams of pinane oxidate, prepared essentially by the process of Example I and containing 37 percent of peroxide by weight, was subjected to steam distillation at about 50° C. and 1 mm. pressure to remove unoxidized pinane. The residue from this topping distillation weighed 35 g. and contained 96 percent peroxide by weight.

EXAMPLE III

*The effect of constant temperature*

The effect of carrying out the oxidation at a constant temperature is illustrated by the following series of experiments carried out using the pinane described in Example I. As in Example I, 13.8 g. of pinane was used in each case and was stirred vigorously in an atmosphere of oxygen under slight positive pressure. When the oxidation was carried out at 150° C., the oxidate contained only 2.3 percent peroxide after one-half hour and the peroxide content dropped to 2.0 percent after 1 hour and to 1.5 percent after 2 hours. At 120° C. the peroxide content increased to 5 percent after one-half hour, and to 7 percent after 1 hour, and then decreased to 6 percent after 2 hours. At 80° C. the peroxide content increased very slowly and was only 9 percent after 16 hours.

EXAMPLE IV

*The effect of removing volatiles at 120° C.*

13.8 g. (0.1 mole) of pinane, $$n_D^{20}=1.4624$$
$$d_4^{20}=0.8560$$
$$[\alpha]_D=+15.3°$$

free from peroxide was placed in a 125 ml. glass reactor, stirred vigorously, and maintained at a temperature of 120° C. Oxygen from a cylinder was passed through the head space of the reactor at the rate of 40 ml. to 50 ml. per minute. The exit gases were passed through a condenser, and the condensate was collected in a trap.

The peroxide content of the oxidate determined at various intervals during the run was:

| Minutes: | Percent by weight of peroxides |
|---|---|
| 20 | 4 |
| 40 | 11 |
| 60 | 19 |
| 80 | 30 |
| 100 | 37 |
| 120 | 49 |
| 130 | 51 |
| 150 | 47 |
| 260 | 36 |

The peroxide content was determined by reacting an aliquot of the oxidate with potassium iodide in acetic acid-chloroform solution for 5 minutes, diluting with water and titrating with aqueous thiosulphate essentially according to the method described by Wheeler, Oil and Soap, vol. 9, p. 89 (1932).

In order to show the effect of failure to remove the volatile oxidation products, a 13.8 g. (0.1 mole) sample of the same pinane as that used above was placed in a 125 ml. glass reactor, maintained at 120° C. and stirred vigorously in an atmosphere of oxygen. A slight positive oxygen pressure was maintained in the reactor. The peroxide content of the oxidate rose to only 5 percent after one-half hour, to 7 percent after 1 hour, and did not increase further during an additional 3 hours' oxidation.

EXAMPLE V

*The effect of removing volatiles at 100° C.*

A 13.8 g. sample of the same pinane used in the preceding example was oxidized at 100° C. with vigorous stirring and with oxygen being passed through the reactor at the rate of 30 ml. per minute. The peroxide content of the oxidate determined at various intervals during the run was:

| Hours: | Percent by weight of peroxides |
|---|---|
| 2 | 7 |
| 4 | 14 |
| 6 | 25 |
| 8 | 42 |
| 10 | 51 |
| 12 | 57 |
| 14 | 71 |
| 16 | 76 |

EXAMPLE VI

*The effect of combining temperature lowering with the removal of volatiles*

A 13.8 g. sample of pinane, similar to that used in the preceding examples, and having the properties $n_D^{20}=1.5627$, $d_4^{20}=0.8558$, $[\alpha]_D=+15.4°$ was oxidized in accordance with Example IV. Oxidation was initiated at 120° C. and after 30 minutes the temperature was reduced to 110° C., and the oxidation was continued for an additional 240 minutes. The oxidate so obtained weighed 15.3 g. and contained 61 percent hydroperoxide by weight. This oxidate was subjected to steam distillation at a temperature of 50° C. and a pressure of about 2 mm. of mercury until substantially all of the unoxidized pinane had been removed. The residue weighed 9.4 g. and contained 90 percent hydroperoxide by weight.

EXAMPLE VII

*The peroxide accumulation during oxidation with temperature lowering and removal of volatiles*

A 138 g. sample of pinane was placed in a 500 ml. glass reactor having a fritted glass false bottom through which gas could be introduced and the reactor was immersed in an oil bath heated to 120° C. Oxygen gas was passed through the pinane at the rate of 10–15 liter per hour. The exit gases were passed through a condenser and trap. After 30 minutes the temperature was reduced to 110° C., and the oxidation was continued at this temperature. Peroxide content of the oxidate at various intervals was:

| Hours: | Percent by weight of peroxides |
|---|---|
| 0.5 | 5 |
| 1.0 | 10 |
| 2.5 | 28 |
| 3.0 | 35 |
| 4.0 | 54 |
| 4.5 | 57 |

The oxidate containing 57 percent of peroxides weighed 157 g. The trap contained 2.8 ml. of condensate.

EXAMPLE VIII

*The preparation of a pinanyl hydroperoxide*

A sample of pinane $[\alpha]_D=-16.0°$, $n_D^{20}=1.4626$, $d_4^{20}=0.857$, was oxidized by stirring vigorously in a stream of oxygen for 48 hours at 80° C. and for an additional 24 hours at 70° C. An oxidate containing about 3.6 percent of active oxygen by weight was obtained.

The unoxidized pinane was removed under vacuum at below 50° C. using water vapor as a carrier gas. A nearly colorless liquid residue was obtained. This product was substantially pure pinanyl hydroperoxides as indicated by the active oxygen content of 9.0 percent. A hydroperoxide $C_{10}H_{18}O_2$ contains 9.4 percent of active oxygen. The product had the physical properties $[\alpha]_D=-14.5°$, $n_D^{20}=1.4893$, $d_4^{20}=1.013$.

The pure peroxides were isolated as a rather viscous colorless liquid, stable at room temperature and capable of being distilled at reduced pressures. When prepared from optically active pinane they are also optically active in the same sense as the pinane. The purest monohydroperoxide distils at about 100° C. at 1 mm. pressure, has a refractive index of 1.489 at 20° ($n_D^{20}$), and a specific gravity ($d_4^{20}$) of 1.013.

As will be readily evident from the foregoing examples oxidation is accomplished on a given initial reaction mixture, without the further addition of terpene during the course of the reaction.

The pinanyl hydroperoxides react quantitatively with potassium iodide in acidic media with the liberation of 1 mole of iodine per mole of hydroperoxide. This reaction may be used to determine the purity of samples of the hydroperoxide or the peroxide content of solutions containing the hydroperoxide.

These hydroperoxides are slightly acidic and form stable salts when treated with concentrated bases. This reaction is useful in purification of these hydroperoxides as the hydroperoxides can be regenerated from its salts by treatment with weak or dilute acids.

Reduction of these peroxides with sodium sulfide solution yields among other products, the known tertiary alcohol pinanol-I (1-methylnopinol) M. P. 74–75° C. The identity of this alcohol was further established by its conversion to cis-terpin when treated with dilute sulfuric acid and to dipentene dihydrochloride on treatment with dry hydrogen chloride—both known reactions of this alcohol. The preparation of this alcohol demonstrated the production of 2-pinanyl hydroperoxide,

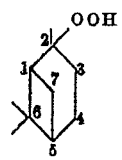

EXAMPLE IX

*The isolation of pinanyl hydroperoxides by precipitation with an aqueous base*

One hundred and ten grams of pinane, $n_D^{20}=1.4625$, $d_4^{20}=0.856$, was oxidized in a slow stream of oxygen with vigorous stirring for 21 hours at 100° C. and then for 5 hours at 70° C. The oxidate contained about 4.0 percent of active oxygen and weighed 125 grams. Sixty grams of this oxidate was diluted with 50 ml. of pentane. This pentane solution was washed with four 25 ml. portions of 20 percent aqueous sodium hydroxide and was then stirred vigorously with 40 grams of 50 percent aqueous sodium hydroxide at room temperature. The sodium salt of pinane hydroperoxide separated as a white granular solid which was separated by filtration. This salt was suspended in water and the mixture was adjusted to pH=10 with 6N hydrochloric acid. The liberated pinane hydroperoxide, after extraction with pentane and subsequent removal of the pentane under vacuum, weighed 10.5 g. and contained about 9.0 percent of active oxygen.

EXAMPLE X

*Pinanyl hydroperoxides as polymerization catalysts*

The product of Example VIII was tested as a catalyst for the emulsion copolymerization of butadiene-styrene at 5° C. in two typical redox systems, one a low-sugar iron system, the other a sugar-free iron system. For comparison, polymerizations were run in an identical manner substituting equal amounts of diisopropylbenzene monohydroperoxide which is one of the best catalysts used commercially for this polymerization, for the pinane hydroperoxides. The percent conversion of monomers to polymer obtained with the two peroxides in the two formulations were:

| Peroxide | Amount [1] | Conversion, low-sugar iron | Percent after 8 hours, sugar-free iron |
|---|---|---|---|
| PHP [2] | 0.06 | 71 | 63 |
| DIBP [3] | 0.06 | 55 | 17 |

[1] Parts of peroxide as pure hydroperoxide per 100 parts of monomers.
[2] Pinanyl hydroperoxides, 96 percent pure.
[3] Diisopropylbenzene monohydroperoxide, 50 percent pure.

EXAMPLE XI

*The preparation of p-menthanyl hydroperoxides*

160 g. sample of p-menthane, $n_D^{20}=1.4415$, $d^{20}=0.8001$ was placed in a 500 ml. reactor and oxygen gas was passed through the sample at the rate of about 30 liters per hour. The reaction was initiated at 145° C. and the temperature was decreased at suitable intervals to minimize decomposition of the peroxide. The peroxide content and temperature of the oxidate at various intervals during the oxidation were:

| Hours | Temperature, °C. | Percent by weight of peroxide |
|---|---|---|
| 0 | 145 | 0 |
| 0.5 | 145 | 1.5 |
| 1.0 | 140 | 5 |
| 1.5 | 135 | 10 |
| 2.5 | 130 | 19 |
| 3.0 | 125 | 22 |
| 3.5 | 120 | 25 |
| 4.0 | 115 | 27 |

153 g. of oxidate was obtained. The unoxidized p-menthane was removed under vacuum at below 70° C. using water vapor as a carrier gas. The residue obtained in this manner had a peroxide content corresponding to 80 percent of p-menthanyl hydroperoxides. The p-menthanyl hydroperoxides produced included 7-methanyl hydroperoxide

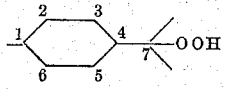

This p-methanyl hydroperoxide concentrate, was diluted with heptane and washed with dilute base to remove traces of acids. After removal of the heptane the residue was distilled at 75°–80° C. at a pressure of 0.2 mm. of mercury. The distillate was diluted with two volumes of pentane and treated with one-half the equivalent amount of 50 percent aqueous sodium hydroxide solution. The sodium salt of the p-menthanyl hydroperoxide which precipitated as a white granular solid was washed with pentane and ether. The p-menthanyl hydroperoxide was then regenerated by suspending the sodium salt in ether and treating with carbon dioxide. Substantially pure p-menthanyl hydroperoxide was obtained by separating the ether solution and stripping off the ether under vacuum. The p-menthanyl hydroperoxide had the properties, $n_D^{20}=1.4659$, $d_4^{20}=0.961$, $\alpha_D=0°$ and contained 9.28 percent of active oxygen. $C_{10}H_{19}OOH$ requires 9.29 percent of active oxygen.

Having thus described our invention, we claim:

1. A tertiary pinanyl hydroperoxide.

2. Tertiary 2-pinanyl hydroperoxide having the skeleton formula:

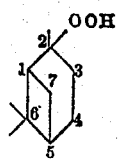

3. A mixture of tertiary pinanyl hydroperoxides having a boiling point above 50° C. at 12 mm.

4. A pinane oxidate consisting essentially of a solution of pinane and tertiary pinanyl hydroperoxides and containing at least about 20% by weight of said pinanyl hydroperoxides, produced by the liquid phase oxidation of pinane by means of gaseous oxygen.

5. A pinane oxidate, consisting essentially of a solution of pinane and tertiary pinanyl hydroperoxides and containing from about 30 to 60% by weight of said tertiary pinanyl hydroperoxides, produced by the liquid phase oxidation of pinane by means of gaseous oxygen.

6. In the liquid-phase oxidation of pinane with free oxygen, the improved method of producing peroxides which comprises, initiating the oxidation of a given reaction mixture containing pinane at a temperature of from about 80° to 150° C. and reducing the reaction temperature of the same reaction mixture in decrements, without further addition of pinane, so that the rate of peroxide formation exceeds the rate of peroxide decomposition.

7. The method of claim 6 in which the oxidation is initiated at from 100° to 120° C. and the reaction is continued until the reaction temperature has been reduced to from 50° to 100° C. and the peroxide content is from about 20 to 60 percent.

8. A process for the production of a tertiary-pinanyl hydroperoxide which comprises: passing an oxygen containing gas into pinane at an initial temperature of from 80° to 150°; maintaining a rate of gas-flow sufficient to remove the volatile addition products as they are formed; and reducing the temperature in decrements so that the rate of peroxide formation exceeds the rate of peroxide decomposition.

9. A liquid phase non-catalytic process for producing tertiary-pinanyl hydroperoxides in a concentration of at least 20 per cent, which comprises: passing an oxygen-containing gas into a given reaction mixture containing pinane at an initial temperature of 80 to 150° C., maintaining a rate of gas flow sufficient to remove the volatile addition products as they are formed, being about 1 to 10 volumes per minute per volume of liquid; reducing the temperature of said same reaction mixture during the course of the oxidation, without further addition of pinane to maintain peroxide formation at a rate exceeding peroxide decomposition, and continuing the reaction at the reduced temperature until the peroxide content is at least 20 per cent.

10. A process of preparing a pinanyl hydroperoxide in a concentration of at least twenty per cent comprising oxidizing a given reaction mixture containing pinane in liquid phase with a stream of oxygen at an initial temperature of said same reaction mixture without further addition of pinane, of 115 to 125° C., decreasing the temperature by about 5° for each 10 per cent of peroxide accumulated and continuing the reaction until at least about 20 per cent of pinanyl hydroperoxide is present in the reaction mixture.

References Cited in the file of this patent

UNITED STATES PATENTS

| | | |
|---|---|---|
| 2,066,717 | Diechsel | Jan. 5, 1937 |
| 2,430,864 | Farkas et al. | Nov. 18, 1947 |
| 2,535,344 | Bishop et al. | Dec. 26, 1950 |
| 2,535,345 | Bishop et al. | Dec. 26, 1950 |
| 2,569,462 | Drake | Oct. 2, 1951 |
| 2,584,773 | Reynolds et al. | Feb. 5, 1952 |
| 2,632,772 | Armstrong et al. | Mar. 24, 1953 |

FOREIGN PATENTS

| | | |
|---|---|---|
| 4,200 | Great Britain | Feb. 27, 1901 |
| 906,347 | France | May 14, 1945 |

OTHER REFERENCES

Frank: Chemical Reviews, vol. 46, pgs. 155–169 (Feb. 1950), 15 pages.